US007501622B2

(12) United States Patent
Kawato

(10) Patent No.: US 7,501,622 B2
(45) Date of Patent: Mar. 10, 2009

(54) ION STORAGE DEVICE

(75) Inventor: Eizo Kawato, Kyoto-fu (JP)

(73) Assignee: Shimadzu Corporation, Kyoto (JP)

( * ) Notice: Subject to any disclaimer, the term of this patent is extended or adjusted under 35 U.S.C. 154(b) by 839 days.

(21) Appl. No.: 10/998,567

(22) Filed: Nov. 30, 2004

(65) Prior Publication Data

US 2005/0127291 A1 Jun. 16, 2005

(30) Foreign Application Priority Data

Dec. 1, 2003 (JP) ............................ 2003-402065

(51) Int. Cl.
*H01J 49/42* (2006.01)
*G01N 27/62* (2006.01)
*G01N 30/72* (2006.01)

(52) U.S. Cl. ........................ 250/292; 250/288; 250/290

(58) Field of Classification Search ................. 250/292; 315/39.51; 331/167
See application file for complete search history.

(56) References Cited

U.S. PATENT DOCUMENTS 6,483,244 B1 11/2002 Kawato et al.
2004/0155183 A1* 8/2004 Kawato ...................... 250/292

FOREIGN PATENT DOCUMENTS

JP 02-205000 A 8/1990
JP 09-182446 A 7/1997
WO WO 00/38312 6/2000

OTHER PUBLICATIONS

Mark G. Qian et al., "A Marriage Made in MS", Analytical Chemistry, vol. 67, Apr. 1, 1995, No. 7, pp. 234A-236A, 238A, 240A-242A.

* cited by examiner

*Primary Examiner*—David A. Vanore
(74) *Attorney, Agent, or Firm*—Westerman, Hattori, Daniels & Adrian, LLP.

(57) ABSTRACT

In the ion storage device 10 according to the present invention, an LC resonant circuit 40 for generating an RF voltage for trapping ions is connected to at least one of the electrodes 11, 12 and 13 surrounding the ion storing space 14. The LC resonant circuit 40 includes switching devices 46, 47 and resistances 48, 49 for stopping the RF voltage when the ions stored in the ion storing space 14 are ejected. The inductance L, the capacitance C and the resistance R of the LC resonant circuit are set to substantially satisfy the critical damping condition, which means that $R=X/2$ where $X=\omega_0 L=(\omega_0 C)^{-1}$. According to this configuration, the RF voltage damps fast when the RF voltage is stopped by the switching devices 46, 47, and the deterioration of the mass resolution of the mass analyzer or the peak shift in the mass spectrum is prevented.

5 Claims, 5 Drawing Sheets

ION STORAGE DEVICE

The present invention relates to an ion storage device, which include an ion trap mass spectrometer and a time-of-flight mass spectrometer using an ion trap as the ion source.

BACKGROUND OF THE INVENTION

One type of ion storage device, such as a quadrupole mass filter, contains ions in the radial direction while allows them to move or drift in the axial direction. Another type of ion storage device, such as a three-dimensional quadrupole ion trap, contains ions in a certain spatial area. In any type of storage devices, they include plural electrodes on which an appropriate radio frequency (RF) voltage is applied to form a quadrupole electric field in the space surrounded by the electrodes. Owing to the quadrupole electric field, ions are contained or stored in the space. The kinetic state of the ions is different depending on their mass to charge ratios, which is used to discriminate or dissociate ions.

In still another type of ion storage devices, a multipole electric field is generated to form a broader ion storing space, whereby a larger number of ions can be stored. The type includes an ion storage device using octapole rods provided with a pair of ion-reflecting end electrodes.

Such an ion storage device may be used as a mass spectroscope by itself, or it may be used as an ion pre-processing device for a subsequent ion analyzer. For example, in a quadrupole mass spectrometer, a pre-filter is placed before a quadrupole mass filter to enhance the ion introducing efficiency from the ion source. In a tandem quadrupole mass spectrometer, plural quadrupole mass filters are serially placed to perform a multi-stage mass analysis. In a quadrupole ion trap mass spectrometer, a quadrupole (four-rod) or an octapole (eight-rod) ion guide is placed before the three-dimensional quadrupole ion trap to improve the ion introducing efficiency.

A multi-stage mass spectrometer was proposed by M. G. Qian and D. M. Lubman in "A Marriage Made in MS", Analytical Chemistry, vol. 67 (1995), No. 7, p. 234A. in which a three-dimensional quadrupole ion trap is placed before a time-of-flight (TOF) mass analyzer. In the mass spectrometer, a multi-stage mass analysis is first performed in the ion trap, and a high-resolution mass spectrum can be obtained with the TOF mass analyzer.

Thus by placing an ion storage device before another mass analyzer such as a TOF mass analyzer, various new mass analyzers have been developed. It should be noted however that, when ions are transferred from the ion storage device to the mass analyzer, the operation parameters of the ion storage device may affect the subsequent mass analyzer. For example, the radio frequency (RF) voltage used in the ion storage device for trapping or storing ions may change the initial kinetic energy of ions transferred to the mass analyzer.

In a mass spectrometer including a quadrupole ion trap and a TOF mass analyzer, for example, ions in the ion trap are always moving due to the RF voltage applied to it. When the ions are transferred to the TOF mass analyzer, an appropriate accelerating voltage is applied to the electrodes of the ion trap, and the ions are accelerated and injected into the TOF mass analyzer.

It is necessary to apply an adequate ion accelerating voltage to the electrode of the ion trap to which ion storing RF voltage was applied. But it is difficult to fix the ion accelerating voltage because an LC resonant circuit is connected to the electrode, which may change the ion accelerating energy. Since the ion storing RF voltage is appropriately modified according to the range of the mass to charge ratio of the object ions, the accelerating energy of ions injected to the TOF mass analyzer is affected according to the operating condition of the ion trap.

In U.S. Pat. No. 6,483,244, a method is described in which the RF voltage is decreased, or stopped, before ions are ejected from the ion trap. The method is now explained using FIG. 1. A coil 42 is connected to the ring electrode 11 to which the RF voltage is applied, and the overall inductance L of the coil 42 and other inductive elements and the overall capacitance C including that between the electrodes, that of the tuning circuit, that of the voltage detecting circuit, etc. form an LC resonant circuit. High voltage DC sources 44 and 45 with respective switching devices 46 and 47 are also connected to the ring electrode 11 to apply a bias voltage.

When the RF voltage to the ring electrode 11 is to be stopped, the two switching devices 46 and 47 are both turned ON, whereby the electric charge stored in the capacitance C of the LC resonant circuit is rapidly discharged. The voltage of the ring electrode 11 after discharge is determined by the voltage of the high voltage DC sources 44, 45 and the internal resistance of the switching devices 46, 47. Since the voltages of the two high voltage DC sources 44 and 45 are normally set equal, and the internal resistances of the two switching devices 46 and 47 are also normally set equal, the voltage of the ring electrode 11 after discharge is equal to the ground level. If, therefore, ions are ejected to the TOF mass spectrometer (TOFMS) 30 in such a condition, ions are properly accelerated irrespective of the operation condition of the ion trap 10, or specifically the magnitude of the RF voltage applied to it. This prevents deteriorating the performance of the TOFMS 30.

SUMMARY OF THE INVENTION

In the above described example of mass spectrometer, the internal resistance of the switching devices 46 and 47 is not specified. Suppose that the values of the internal resistance of the switching devices 46 and 47 are respectively 2R, and the value of the capacitance of the LC resonant circuit is C, the discharging time constant is RC. Conventionally, the value of the internal resistance R of the switching devices was made as small as possible in order to shorten the time constant RC and quickly discharge the electric charge stored in the capacitance C of the LC resonant circuit.

If the value of the resistance R is very small, the electric charge stored in the capacitance C of the LC resonant circuit is discharged and the voltage of the ring electrode 11 becomes equal to the ground in a very short time. However, actual switching devices 46 and 47 use semiconductor elements such as MOSFETs, which are difficult to flow a large current, or difficult to conduct a large amount of electric charge in a short time. Semiconductor elements such as MOSFETs normally have a maximum allowable current, so that MOSFETs are generally controlled with the gate voltage not to exceed the maximum allowable current. When switching devices having lower internal resistance R are used as the switching devices 46 and 47, the voltage across the switching devices 46 and 47 does not depend on the voltage drop due to the current passing through them. This lowering of the resistance R makes the current passing through the switching devices 46 and 47 constant, which means that their effective resistance observed from the ring electrode 11 becomes infinitely large. Then the electric charge stored in the capacitor C of the LC resonant circuit is not discharged through the switching devices 46 and 47 though they are both turned ON, and the RF voltage continues to oscillate.

When the resistance R has a certain non-zero value, the discharging time is finite during which an electric current flows through the coil 42. The current flowing through the coil 42 turns to heat due to the internal resistance of the switching devices 46 and 47, and is damped. When the resistance R is small, therefore, the damping of the current is slow. This causes a finite residual voltage of the ring electrode 11, rather than the ground voltage, when ions are injected into the TOFMS 30. The value of the residual voltage of the ring electrode 11 depends on the value of the RF voltage at the moment when the switching devices 46 and 47 are turned ON, which causes peak shifts and deterioration of mass resolution in the mass spectrum taken in the TOFMS 30.

Thus the operation parameters of the ion trap 10 such as the RF voltage for storing ions affect the performances of the mass analyzer 30, such as its resolution or the peak shift, through the change in the initial kinetic energy of ions ejected from the ion trap 10 and injected into the subsequent mass analyzer 30.

An object of the present invention is therefore to address the above problem. According to the present invention, an ion storage device includes:

a plurality of electrodes enclosing an ion storing space;

an LC resonant circuit for applying an RF voltage for storing ions to at least one of the plurality of electrodes; and switching means and resistance means included in the LC resonant circuit for stopping the RF voltage when ions stored in the ion storing space are ejected therefrom, where an inductance L, a capacitance C and an effective resistance R of the LC resonant circuit substantially satisfy a critical damping condition.

In the present invention, the LC resonant circuit of the ion storage device includes switching means and resistance means, where the switching means is used to stop the RF voltage when ions are ejected from the ion storing space. Since the inductance L, the capacitance C and the effective resistance R substantially satisfy the critical damping condition, the RF voltage is damped in a short time after the switching means is turned to stop it. The quick damping prevents deterioration of the performances of the subsequent mass analyzer, including the lowering of the mass resolution and shift of the peaks in the mass spectrum.

DETAILED DESCRIPTION OF PREFERRED EMBODIMENTS

Figure 1:
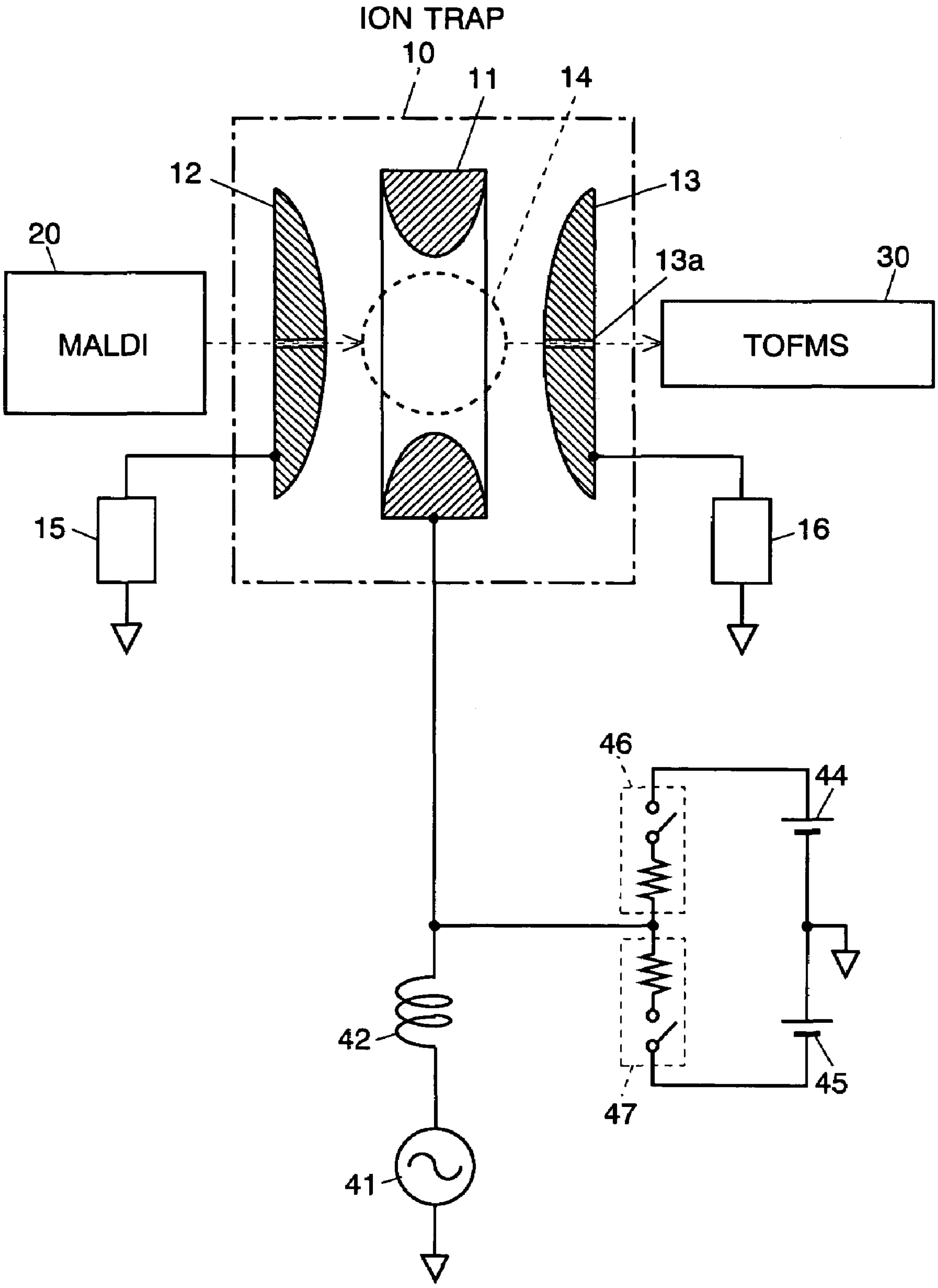
FIG. 1 is a schematic diagram of a mass spectrometer using an ion trap as an ion storage device.
Figure 2:
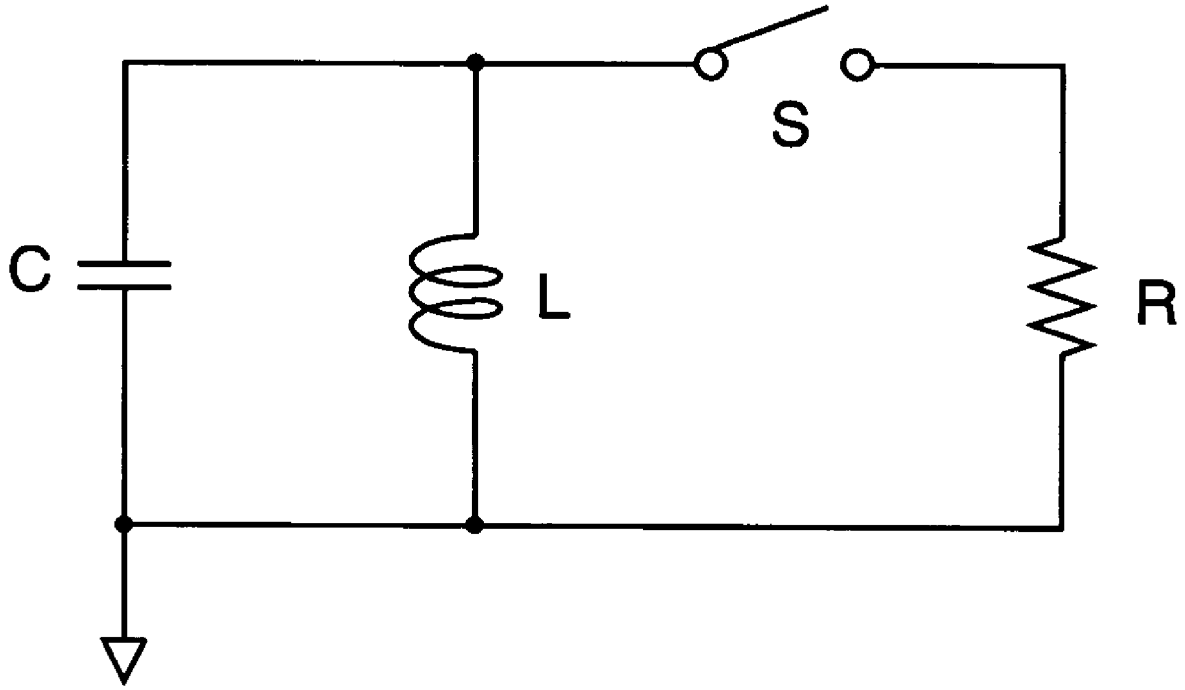
FIG. 2 is a simplified circuit diagram for explaining the working principle of the present invention.

The working principle of the ion storage device of the present invention is first explained. An LC resonant circuit connected to an ion storage device is approximately represented by L and C in FIG. 2. In FIG. 2, L represents the coil connected to the ring electrode, and C represents the total capacitance of the whole elements connected to the ring electrode in a case of a quadrupole ion trap. In an actual device, an RF driver is connected to resonate the LC resonant circuit. Further, the resistance of about tens of ohms consisted of the coil and other lines in the circuit forms an LCR circuit together with the LC components. Values of these components determine the Q value of the LCR circuit, and the Q value determines the ratio of the RF voltage generated in the ring electrode to the output voltage of the RF driver. Since these do not affect the working principle of the present invention, they are omitted in FIG. 2.

As shown in FIG. 2, the switching means S and the resistance means R connected to the ring electrode are connected in parallel to L and C. The switching means S can be in any form if it can turn ON and OFF the electric current: e.g., mechanical one such as a relay, electronic one using semiconductor elements such as MOSFET or analog switch, etc. can be used. Resistance means R includes not only the resistors connected to the circuit but also the internal resistance of the switching means when it is ON and the resistance included in any other elements. The effective value of the resistance means R is R.

When the switching means S is OFF, the initial RF voltage V applied to the LC resonant circuit is maintained. Taking the initial phase arbitrarily, the RF voltage V at time t is represented as $$V=V_0\cos\omega_0 t \quad (1),$$

where $\omega_0=(LC)^{-1/2}$ is the resonance angular frequency of the LC resonant circuit, and $V_0$ is the peak voltage.

When the switching means S is turned ON at time t0, the LCR parallel resonant circuit begins to work. Representing the reactance of the coil by $X=\omega_0 L=(\omega_0 C)^{-1}$, if R>X/2, the RF voltage V is damped with the damping constant of 1/(2RC). This shows that as the value of resistance R becomes greater, the RF voltage V is damped slower.

On the other hand, if R<X/2, two damping constants are possible, and the RF voltage V splits into a faster damping component and a slower damping component as the value of resistance R becomes smaller. If the value of the RF voltage V is at its peak ($+V_0$ or $-V_0$) at the moment when the switching means S is turned ON, the electromagnetic energy of the LC resonant circuit is stored in the capacitor C, and is quickly discharged after that. On the contrary, if the value of the RF voltage V is zero at the moment when the switching means S is turned ON, the electromagnetic energy of the LC resonant circuit is stored in the inductance L as the coil current, and it takes a longer time until the current is damped as the resistance R is smaller.

Thus, the fastest way of damping the RF voltage is to decrease the value of R and turn ON the switching means S at the moment when the RF voltage is at its peak ($+V_0$ or $-V_0$). As described before, the current possible to flow through the switching means S is limited, and it is difficult to decrease the value of R greatly. In that case, even if the RF voltage V is turned ON at the moment when the RF voltage is at its peak ($+V_0$ or $-V_0$), a coil current is induced while the capacitor C discharges, and it takes a long time until the coil current is damped. Since the damping voltage waveform is proportional to the peak voltage $V_0$ before the switching means S is turned ON, when the value $V_0$ is changed depending on the ion storage conditions, the RF voltage V at the time when ions are ejected changes, which affects the performances of the subsequent mass analyzer.

In order to quickly reduce the energy of the induced coil current, the effective resistance is increased to R=X/2 in the present invention. In this case, the damping constant is $\omega_0$, which is the critical damping condition of the resonant circuit. This is the condition in which the voltage is damped fastest under any initial condition. Using the critical damping condition, the RF voltage can be damped in an adequately short time after the switching means S is turned ON and before ions dissipate. Then by ejecting the ions, the performances of the subsequent mass analyzer are not affected by the change in the operation condition of the ion storage device before the ions are ejected.

The waveform of the RF voltage in the period $t>t_0$ is represented by $$V=V_0(\cos\omega_0 t_0-\omega_0(t-t_0)(\sin\omega_0 t_0+\cos\omega_0 t_0))\exp(-\omega_0(t-t_0)) \quad (2)$$

In the above equation, RF voltage can be minimized by making $\sin\omega_0 t_0+\cos\omega_0 t_0=0$ and, then, minimizing the term including time $(t-t_0)$. Since, however, the initial kinetic energy of ions when they are ejected depends on the movement of ions in the ion storage device, the optimal condition should be experimentally determined by changing the value of $t_0$.

Embodiment 1

Figure 3:
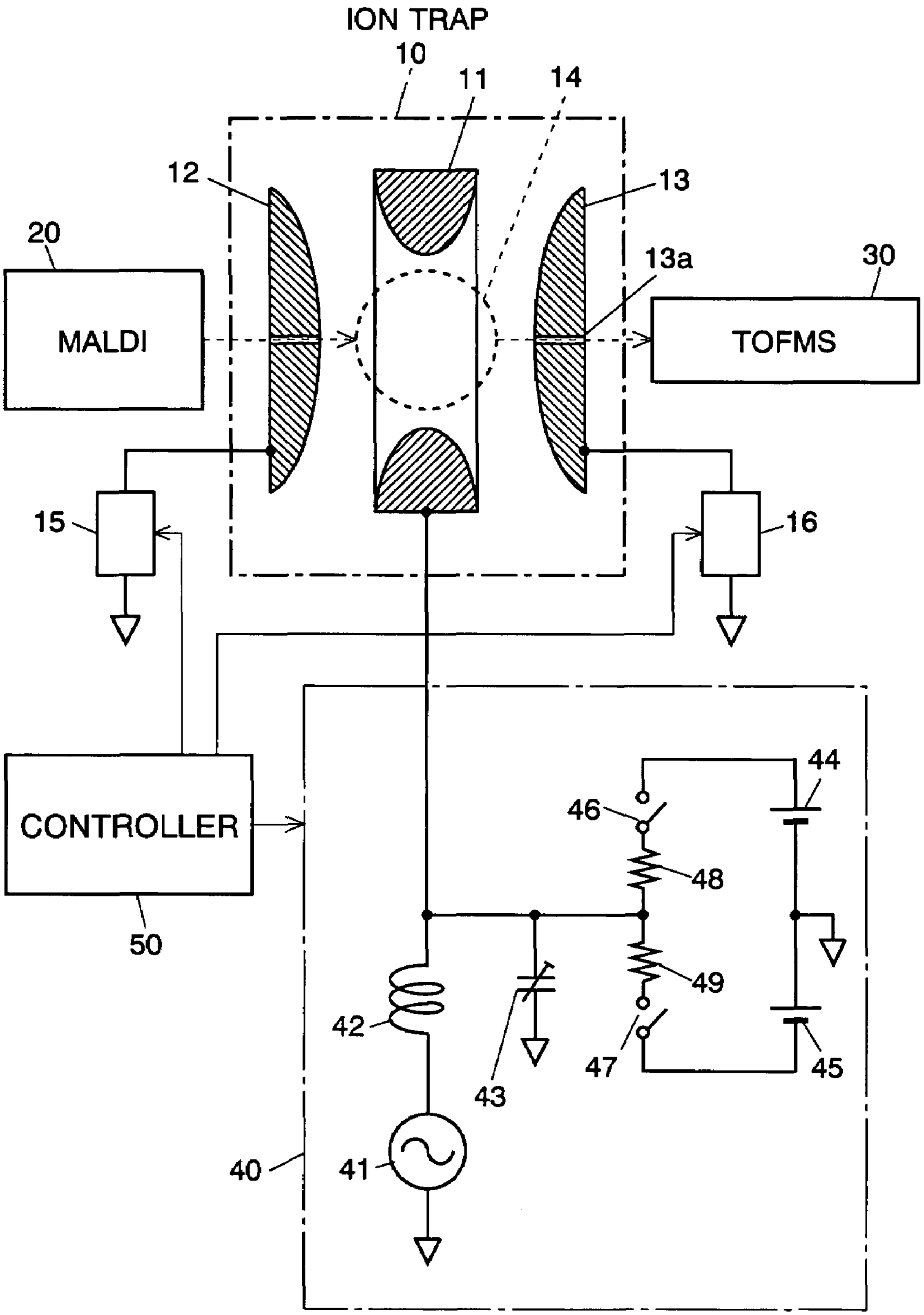
FIG. 3 is a schematic diagram of a mass spectrometer as the first embodiment of the present invention.

An ion storage device embodying the present invention is described. FIG. 3 shows the main part of a mass spectrometer using an ion trap 10 as the ion storage device. The ion trap 10 is composed of a ring electrode 11 and a pair of opposing end cap electrodes 12 and 13 with the ring electrode 11 between them. An RF voltage generated in the RF driver circuit 41 is applied to the ring electrode 11, so that a quadrupole electric field is generated in the space surrounded by the electrodes 11, 12 and 13, and an ion storing space 14 is formed there. End cap voltage generators 15 and 16 are respectively connected to the end cap electrodes 12 and 13, which applies appropriate voltages to them at appropriate periods of an analysis.

When, for example, ions generated in an ion source 20 using MALDI (Matrix-Assisted Laser Desorption/Ionization) are injected into the ion trap 10, appropriate voltages for decreasing the energy of the ions are applied to the end cap electrodes 12 and 13. When, on the other hand, a mass analysis is performed in the TOFMS 30, other appropriate voltages are applied to the end cap electrodes 12 and 13 for accelerating ions in the ion trap space 14 to the TOFMS 30. Further, when ions are selected or dissociated in the ion trap 10, still other appropriate voltages are applied to the end cap electrodes 12 and 13 to generate a proper selecting or dissociating electric field in addition to the quadrupole electric field generated by the RF voltage.

As a part of the ring voltage generator 40 for applying the RF voltage to the ring electrode 11, a coil 42 is connected to the ring electrode 11. The coil 42 and the capacitance formed between the ring electrode 11 and the end cap electrodes 12 and 13 basically constitute an LC resonant circuit. Precisely saying, the resonant frequency is determined by the inductance of the coil 42 and the total capacitance including that between the electrodes 11, 12 and 13, that of the RF voltage monitoring circuit (not shown), tuning circuit 43, switching devices 46, 47 and the lines.

There are various methods of driving the LC resonant circuit, including one using a transformer. In the present embodiment, an end of the coil 42 is directly driven by the RF driver 41. Since the frequency of the RF driver 41 is fixed at 500 kHz, the tuning circuit 43 is tuned to adjust the resonant frequency of the LC resonant circuit to 500 kHz, so that a resonated and amplified voltage is obtained. In the present embodiment, a vacuum variable capacitor is used for the tuning circuit 43, and its capacitance is adjusted to obtain resonance. Alternatively, the inductance of the coil 42 can be adjusted, moving a ferrite core, for example, to obtain resonance.

To the ring electrode 11 are further connected high voltage DC sources 44, 45 via switching devices 46, 47 and resistances 48, 49 as shown in FIG. 3. These are used to start the RF voltage when ions are injected into the ion trap 10, and to stop it when ions are ejected from the ion trap 10. When the RF voltage is stopped, however, the RF voltage cannot stop instantaneously but decreases exponentially with a certain time constant.

The method of quickly damping the RF voltage when ions are ejected is described. When a sample is analyzed, ions are introduced in the ion storing space 14, and various operations are made on the ions such as selection, excitation or dissociation. At this time, an RF voltage of an appropriate amplitude is applied to the ring electrode 11 depending on the range of mass to charge ratio of the object ions. Then, in order to eject ions from the ion storing space 14, the switching devices 46, 47 are simultaneously turned ON and the output of the RF driver 41 is turned zero. The ring electrode 11 is connected to the high voltage DC sources 44, 45 via the resistances 48, 49, and the RF voltage that had been applied to the ring electrode 11 before the switching devices 46, 47 are turned ON decreases exponentially as shown by equation (2). When the RF voltage is adequately decreased, ion ejecting high voltages are applied from the end cap voltage generators 15, 16 to the end cap electrodes 12, 13 respectively, so that ions are accelerated and ejected through the hole 13*a* of the end cap electrode 13 to the TOFMS 30. In the present embodiment, the ion ejecting high voltages are applied to the end cap electrodes 12, 13 about three microseconds after the switching devices 46, 47 are turned ON. The controller 50 controls the operations of the ring voltage generator 40, end cap voltage generators 15, 16 and other parts of the mass spectrometer in order to perform a mass analysis of a sample.

In the present embodiment, semiconductor switches are used for the switching devices 46, 47 in consideration of the switching speed. Specifically, a switching device is composed of a serially connected several MOSFETs, and they are simultaneously turned ON or OFF, functioning as a switch. This structure endows the switching device with the strength to a high voltage. Further, plural resistors are serially connected to the MOSFETs, constituting the total resistances 48, 49 together with the resistances of the MOSFETs when they are ON. The circuit seems to be different from that of FIG. 2, but they are substantially equal if the DC voltage of the ring electrode 11 is set at zero (ground) as shown by the upside-down triangle by appropriately adjusting the effective resistance of the resistances 48, 49 and the voltage of the high voltage DC sources 44, 45, and the damping effect is possible by the resistances.

The inductance of the coil 42 is about 1 mH in the present embodiment, and the capacitance C of the tuning circuit 43 is adjusted at about 100 pF so that a desired RF voltage can be produced by amplifying the output of the 500 kHz RF driver 41. The reactance of the coil 42 at 500 kHz is about X=3.14 kO. In order to satisfy the critical damping condition, the effective value of the resistance is set at R=X/2=1.57 kO. In the embodiment 1 of FIG. 3, two resistances 48 and 49 are connected in parallel, so that the effective value of each resistance is set at about 3.14 kO. It should be noted here that the value includes total resistance of all the MOSFETs connected in series, so that the total resistance of resistors itself is smaller.

Embodiment 2

Figure 4:
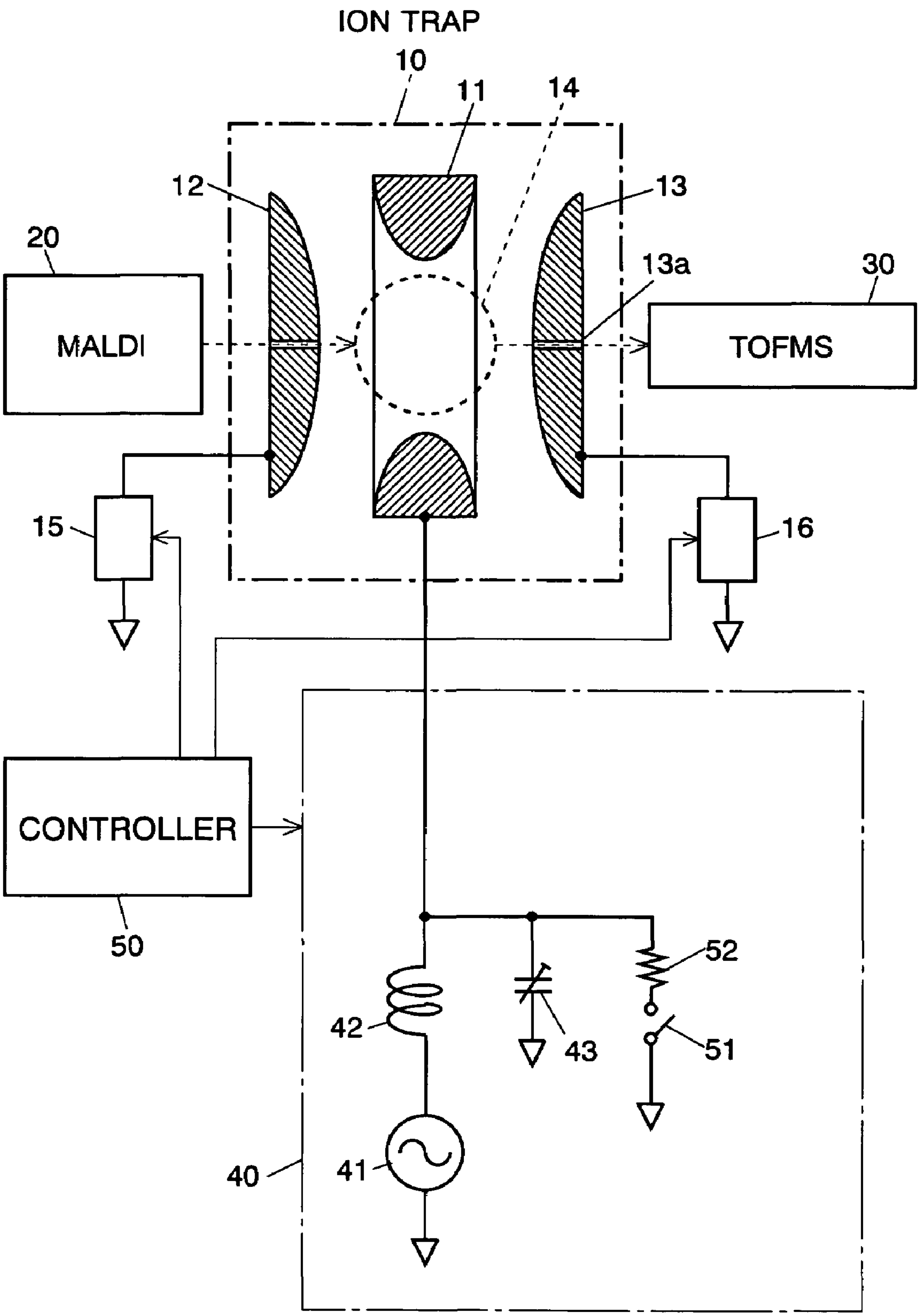
FIG. 4 is a schematic diagram of a mass spectrometer as the second embodiment of the present invention.

In the above embodiment 1, two switching devices and two resistances are used to perform the function of the present invention. FIG. 4 shows another embodiment (Embodiment 2), in which a switching device 51 and a resistance 52 realizes the same function. The switching device 51 and the resistance 52 in FIG. 4 only symbolically show the functions of turning on and off the electric current and consuming energy of the electric current respectively, so that the order of the actual switching device and the resistance may be reversed as long as the circuit satisfies the critical damping condition.

Embodiment 3

Figure 5:
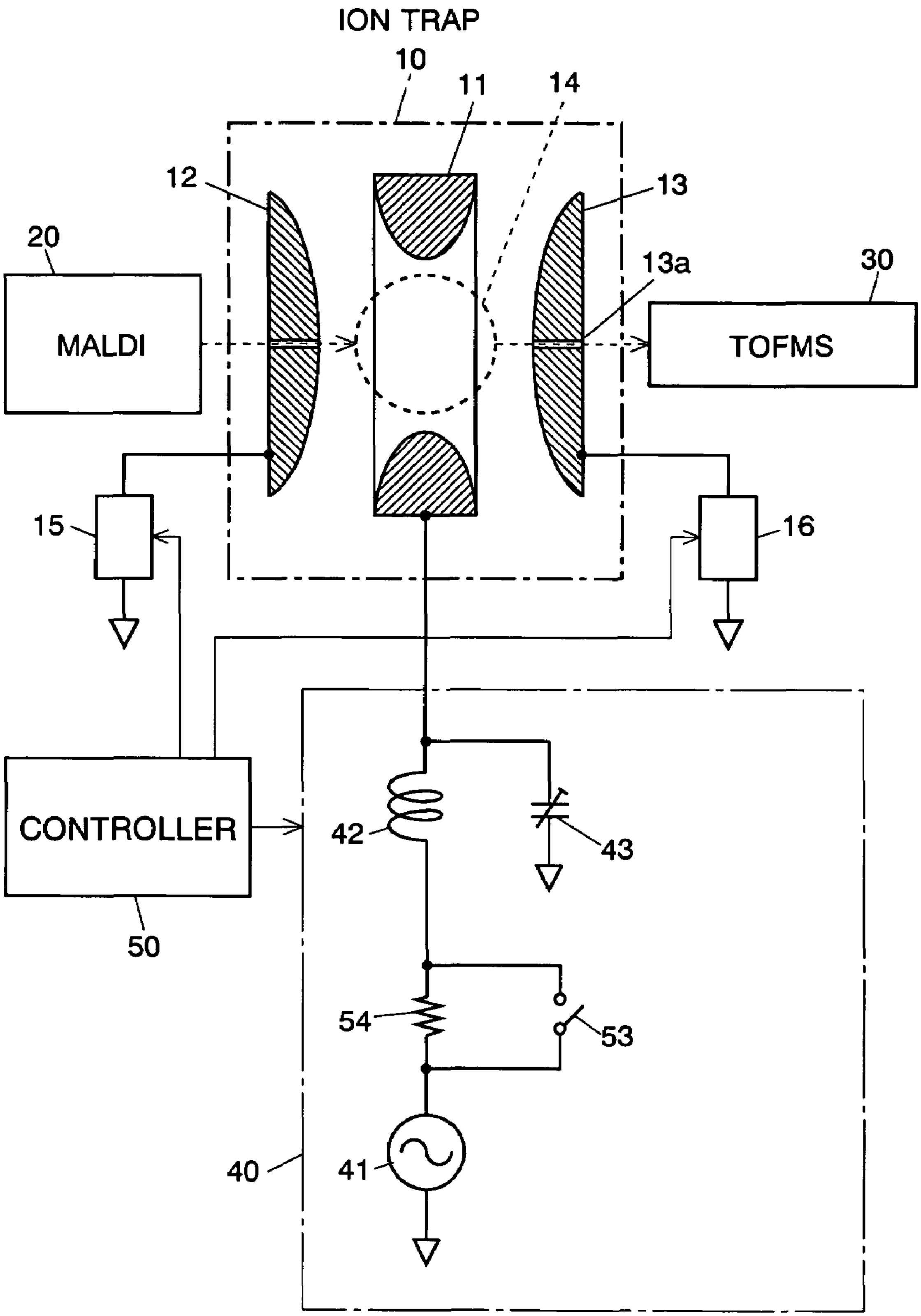
FIG. 5 is a schematic diagram of a mass spectrometer as the third embodiment of the present invention.

FIG. 5 shows still another embodiment (Embodiment 3) of the present invention, in which an ion trap 10 is used as the ion storage device. A resistance 54 is connected in series to the coil 42, and a switching device 53 is connected in parallel to the resistance 54. Contrary to the previous embodiment 2, the switching device 53 is maintained ON while ions are stored in the ion trap 10 and operations on the ions, such as selection and excitation, are performed. When the RF voltage is quickly damped, the switching device 53 is turned OFF, and the electric current flowing through the coil 42 is led to the resistance 54. In this case, the condition of critical damping for the effective resistance R is $$R=2X=2\omega_0 L=6.28\ \mathrm{kO}.$$

The waveform when the switching device 53 is turned OFF is a damping waveform represented similarly to the equation (2) where the damping constant is $\omega_0$.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

In the preceding embodiments and drawings, a point of the circuit is grounded for the simplicity of explanation. It should be noted that the grounded point may be any part of the circuit, or the circuit may not be grounded at all if the quadrupole electric field can be generated in the ion trap and the RF voltage can be damped when the switching means is operated.

Further, though the RF driver 41 is directly connected to the coil 42 in the preceding embodiments, the coil can be driven by a transformer coupling or any other means. In that case, the switching means and the resistance means may be connected in either of the primary circuit or the secondary circuit of the transformer as long as the critical damping condition is fulfilled.

The effective resistance value of the resistance means is set to satisfy the critical damping condition in the preceding embodiments. It should be noted that the resistance value may not be exactly equal to the critical damping conditional value, but it may be a value close to that, in which case almost the same damping effect can be obtained, and it is possible to damp the RF voltage adequately in the period from the time when switching means is operated for stopping RF voltage before the ion ejecting high voltage is applied to the end cap electrodes and before the ions dissipate. Thus the effective resistance value of the resistance means may not be exactly the same as the critical damping conditional value as long as such condition is satisfied.

What is claimed is:

1. An ion storage device comprising:

a plurality of electrodes enclosing an ion storing space;

an LC resonant circuit for applying an RF voltage for storing ions to at least one of the plurality of electrodes; and switching means and resistance means included in the LC resonant circuit for stopping the RF voltage when ions stored in the ion storing space are ejected therefrom, where an inductance L, a capacitance C and an effective resistance R of the LC resonant circuit substantially satisfy a critical damping condition.

2. The ion storage device according to claim 1, wherein the switching means is a relay device, a semiconductor device or a combination thereof.

3. The ion storage device according to claim 2, wherein the effective resistance R is made of a resistance of the relay device, the semiconductor device or the combination thereof, and of a resistance of resistors.

4. The ion storage device according to claim 1, wherein the LC resonant circuit including the resistance means constitutes an LCR parallel resonant circuit when the switching means is operated to stop the RF voltage, and the value of the effective resistance R is set at half of the reactance of the inductance L or the capacitance C of the LC resonant circuit.

5. The ion storage device according to claim 1, wherein the LC resonant circuit including the resistance means constitutes an LCR series resonant circuit when the switching means is operated to stop the RF voltage, and the value of the effective resistance R is set twice as the reactance of the inductance L or the capacitance C of the LC resonant circuit.

* * * * *